(12) United States Patent
Yuan

(10) Patent No.: US 11,790,553 B2
(45) Date of Patent: Oct. 17, 2023

(54) METHOD AND APPARATUS FOR DETECTING TARGET OBJECT, ELECTRONIC DEVICE AND STORAGE MEDIUM

(71) Applicant: Beijing Baidu Netcom Science and Technology Co., Ltd., Beijing (CN)

(72) Inventor: Yuchen Yuan, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 166 days.

(21) Appl. No.: 17/355,137

(22) Filed: Jun. 22, 2021

(65) Prior Publication Data

US 2021/0319231 A1 Oct. 14, 2021

(30) Foreign Application Priority Data

Oct. 23, 2020 (CN) .......................... 202011143175.X

(51) Int. Cl.
*G06T 7/73* (2017.01)
*G06T 7/77* (2017.01)
(Continued)

(52) U.S. Cl.
CPC .................. *G06T 7/73* (2017.01); *G06N 3/04* (2013.01); *G06T 7/77* (2017.01); *G06V 10/764* (2022.01);
(Continued)

(58) Field of Classification Search
CPC ... G06T 7/73; G06T 7/77; G06T 2207/10016; G06T 2207/30241; G06T 7/246; G06T 2207/20081; G06T 2207/20084; G06T 2207/30196; G06N 3/04; G06N 3/045; G06N 3/08; G06V 10/764; G06V 10/82;
(Continued)

(56) References Cited

U.S. PATENT DOCUMENTS

| 2019/0347828 A1* | 11/2019 | Yang | G06V 10/245 |
| 2022/0020167 A1* | 1/2022 | Woo | G06V 10/25 |
| 2022/0215727 A1* | 7/2022 | Jeong | G06V 10/82 |

FOREIGN PATENT DOCUMENTS

| AU | 2021102397 A4 | 6/2021 |
| CN | 107403141 A | 11/2017 |

(Continued)

OTHER PUBLICATIONS

Jifeng et al., ("Deformable convolutional networks", Proceedings of the IEEE international conference on computer vision, 2017, (12 pages) (Year: 2017).*

(Continued)

*Primary Examiner* — Amara Abdi
(74) *Attorney, Agent, or Firm* — Ice Miller LLP

(57) ABSTRACT

Embodiments of the present disclosure provide a method and apparatus for detecting a target object, an electronic device, and a computer readable storage medium. The method may include: acquiring a to-be-detected image; processing the to-be-detected image using an object detection model including a deformable convolutional layer to obtain an offset prediction result of the deformable convolutional layer; and adjusting a size of an anchor point using the offset prediction result, and determining position information of the target object in the to-be-detected image using the anchor point of the adjusted size.

11 Claims, 3 Drawing Sheets

(51) Int. Cl.
*G06N 3/04* (2023.01)
*G06V 20/40* (2022.01)
*G06V 20/52* (2022.01)
*G06V 10/764* (2022.01)
*G06V 10/82* (2022.01)
*G06V 40/10* (2022.01)

(52) U.S. Cl.
CPC .............. *G06V 10/82* (2022.01); *G06V 20/46* (2022.01); *G06V 20/52* (2022.01); *G06V 40/103* (2022.01); *G06T 2207/10016* (2013.01); *G06T 2207/30241* (2013.01); *G06V 2201/07* (2022.01)

(58) Field of Classification Search
CPC ...... G06V 20/46; G06V 20/52; G06V 40/103; G06V 2201/07; G06V 20/42; G06V 10/25; G06V 10/44; G06V 20/48; G06F 18/24
See application file for complete search history.

(56) References Cited

FOREIGN PATENT DOCUMENTS

| | | | | |
|---|---|---|---|---|
| CN | 109801270 | A | 5/2019 | |
| CN | 111402226 | A | 7/2020 | |
| CN | 111597941 | * | 8/2020 | ........... G06F 18/214 |
| CN | 111597941 | A | 8/2020 | |
| KR | 102139582 | B1 | 7/2020 | |

OTHER PUBLICATIONS

Mingyang, et al., "Automatic aircraft detection in remote sensing images using multi-scale deformable convolutional neural network" , China Academic Journal Electronic Publishing House, Jul. 2020, vol. 39, issue 7, English abstract. (6 pages) (Year: 2020).*

Xin, et al., "Vehicle Detection in Remote Sensing Images of Dense Areas Based on Deformable Convolution Neural Network", Journal of Electronics & Information Technology, Dec. 2018, vol. 40, No. 12. English abstract. (8 pages) (Year: 2018).*

European Patent Office; Extended European Search Report for European Patent Application No. 21179400.3, dated Dec. 17, 2011 (11 pages).

Tian Zhuangzhuang et al.; "Generating Anchor Boxes Based on Attention Mechanism for Oject Detection in Remote Sensing Images"; Remote Sensing, vol. 12, No. 15, p. 2416; Jul. 28, 2020; XP055866835; DOI: 10.3390/rs12152416 (18 pages).

Xingyu Chen et al.; "Dual Refinement Network for Single-Shot Object Detection"; Arxiv.org, Cornell University Library, Cornell University, Ithaca, NY; Jul. 23, 2018; XP081117910 (8 pages).

Chen Xiangyu et al.; "Joint Anchor-Feature Refinement for Real-Time Accurate Object Detection in Images and Videos"; IEEE Transactions on Circuits and Systems for Video Technology; IEEE, USA; vol. 31, No. 2, pp. 594-607; Mar. 16, 2020; XP011834355; ISSN: 1051-8215 (14 pages).

Xizhou Zhu et al,: "Deformable ConvNets v2: More Deformable, Better Results"; Arxiv.org, Cornell University Library, Cornell University, Ithaca, NY; Nov. 27, 2018; XP080939631 (13 pages).

Li Mingyang, et al., "Automatic aircraft detection in remote sensing images using multi-scale deformable convolutional neural network", China Academic Journal Electronic Publishing House, Jul. 2020, vol. 39, issue 7. English abstract. (6 pages).

Dai, Jifeng, et al. "Deformable convolutional networks." Proceedings of the IEEE international conference on computer vision. 2017. (12 pages).

Gao Xin, et al., "Vehicle Detection in Remote Sensing Images of Dense Areas Based on Deformable Convolution Neural Network", Journal of Electronics & Information Technology, Dec. 2018, vol. 40, No. 12. English abstract. (8 pages).

* cited by examiner

METHOD AND APPARATUS FOR DETECTING TARGET OBJECT, ELECTRONIC DEVICE AND STORAGE MEDIUM

CROSS-REFERENCE TO RELATED APPLICATIONS

This application claims priority to Chinese Patent Application No. 202011143175.X, filed on Oct. 23, 2020, titled "Method and apparatus for detecting target object, electronic device and storage medium," which is hereby incorporated by reference in its entirety.

TECHNICAL FIELD

The present disclosure relates to the field of computer technology, in particular to the field of artificial intelligence, and more particular to a method and apparatus for detecting a target object, an electronic device, and a computer readable storage medium.

BACKGROUND

With the constant development of the Internet and artificial intelligence technology, more and more fields begin to involve automated calculation and analysis, in which object detection is one of the most important functions, such as pedestrian detection in surveillance video.

In the existing methods of using deep convolutional neural networks to detect objects in images, a set of anchor points of a fixed size are used for extracted image features to detect whether a target object is included.

SUMMARY

Embodiments of the present disclosure propose a method and apparatus for detecting a target object, an electronic device, and a computer readable storage medium.

According to a first aspect, an embodiment of the present disclosure provides a method for detecting a target object, the method including: acquiring a to-be-detected image; processing the to-be-detected image using an object detection model including a deformable convolutional layer to obtain an offset prediction result of the deformable convolutional layer; and adjusting a size of an anchor point using the offset prediction result, and determining position information of the target object in the to-be-detected image using the anchor point of the adjusted size.

According to a second aspect, an embodiment of the present disclosure provides an apparatus for detecting a target object, the apparatus including: a to-be-detected image acquisition unit, configured to acquire a to-be-detected image; an offset prediction result acquisition unit, configured to process the to-be-detected image using an object detection model including a deformable convolutional layer to obtain an offset prediction result of the deformable convolutional layer; and an anchor point size adjustment and position determination unit, configured to adjust a size of an anchor point using the offset prediction result, and determine position information of the target object in the to-be-detected image using the anchor point of the adjusted size.

According to a third aspect, an embodiment of the present disclosure provides an electronic device, including: at least one processor; and a memory, communicatively connected to the at least one processor. The memory stores instructions executable by the at least one processor, the instructions, when executed by the at least one processor, cause the at least one processor to perform the method for detecting a target object according to any implementation in the first aspect.

According to a fourth aspect, an embodiment of the present disclosure provides a non-transitory computer readable storage medium, storing computer instructions, the computer instructions, being used to cause the computer to perform the method for detecting a target object according to any implementation in the first aspect.

The method and apparatus for detecting a target object, the electronic device, and the computer readable storage medium provided by the embodiments of the present disclosure, first acquiring a to-be-detected image; then, processing the to-be-detected image using the object detection model including a deformable convolutional layer to obtain the offset prediction result of the deformable convolutional layer; and adjusting a size of the anchor point using the offset prediction result, and determining position information of the target object in the to-be-detected image using the anchor point of the adjusted size.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

By reading the detailed description of non-limiting embodiments with reference to following accompanying drawings, other features, objectives and advantages of the present disclosure will become more apparent.

DETAILED DESCRIPTION OF EMBODIMENTS

The present disclosure will be further described in detail below with reference to the accompanying drawings and embodiments. It may be understood that the embodiments described herein are only used to explain the relevant disclosure, but not to limit the disclosure. In addition, it should be noted that, for ease of description, only the parts related to the relevant disclosure are shown in the accompanying drawings.

It should be noted that embodiments in the present disclosure and features in the embodiments may be combined with each other on a non-conflict basis. The present disclosure will be described below in detail with reference to the accompanying drawings and in combination with the embodiments.

Figure 1:
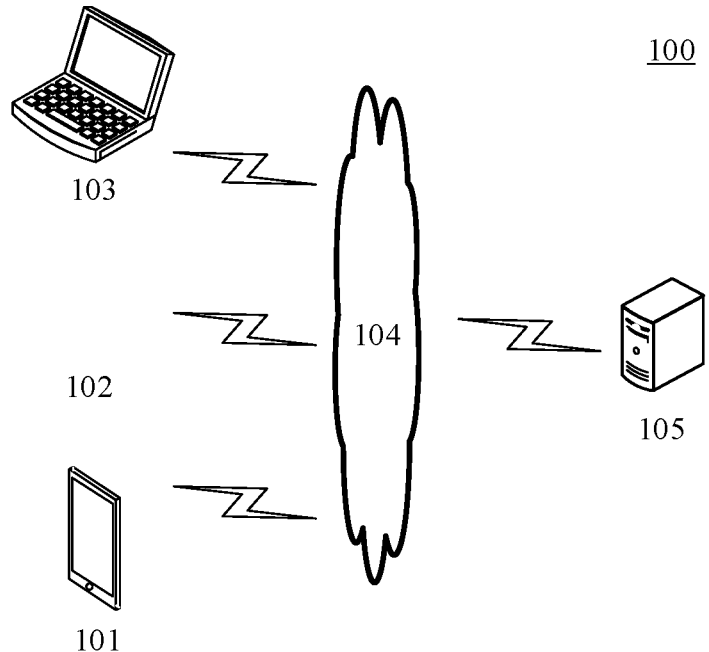
FIG. 1 is an example system architecture in which embodiments of the present disclosure may be implemented.

FIG. 1 shows an example system architecture 100 to which the embodiments of a method, apparatus, electronic device, and computer readable storage medium for detecting a target object of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various connection types, such as wired, wireless communication links, or optic fibers.

A user may use the terminal devices 101, 102, 103 to interact with the server 105 through the network 104 to receive or send messages, and so on. The terminal devices 101, 102, 103 and the server 105 may be installed with various applications for implementing information communication between the two, such as image transmission applications, object detection applications, or instant messaging applications.

The terminal devices 101, 102, 103 and the server 105 may be hardware or software. When the terminal devices 101, 102, 103 are hardware, they may be various electronic devices having display screens, including but not limited to smart phones, tablet computers, surveillance cameras, laptop computers, desktop computers, etc.; when the terminal devices 101, 102, and 103 are software, they may be installed in the electronic devices listed above, which may be implemented as a plurality of pieces of software or a plurality of software modules, or as a single piece of software or a single software module, which is not limited herein. When the server 105 is hardware, it may be implemented as a distributed server cluster composed of a plurality of servers, or as a single server; when the server is software, it may be implemented as a plurality of pieces of software or a plurality of software modules, or as a single piece of software or a single software module, which is not limited herein.

The server 105 may provide various services through various built-in applications. For example, an object detection application that may provide target object detection services, and the server 105 may achieve the following effects when running the object detection application: first, acquiring a to-be-detected image from the terminal devices 101, 102, 103 through the network 104; then, processing the to-be-detected image using an object detection model including a deformable convolutional layer to obtain an offset prediction result of the deformable convolutional layer; and adjusting a size of an anchor point using the offset prediction result, and determining position information of the target object in the to-be-detected image using the anchor point of the adjusted size.

It should be noted that, in addition to real-time acquisition of the to-be-detected image from the terminal devices 101, 102, 103 through the network 104, the to-be-detected image may alternatively be pre-stored locally in the server 105 in various methods. Therefore, upon detecting that these data have been stored locally (for example, a to-be-processed object detection task kept before starting processing), the server 105 may choose to directly acquire these data locally. In this circumstance, the example system architecture 100 may not include the terminal devices 101, 102, 103 and the network 104.

Since various processing for the image requires many computing resources and strong computing power, the method for detecting a target object provided in subsequent embodiments of the present disclosure is generally performed by the server 105 having strong computing power and many computing resources. Correspondingly, the apparatus for detecting a target object is generally also provided in the server 105. However, it should also be noted that when the terminal devices 101, 102, and 103 also have the required computing power (for example, the object detection model is stored locally) and computing resources, the terminal devices 101, 102, and 103 may also use the object detection application installed thereon to complete the above various operations that are originally assigned to the server 105, and then output a same result as the server 105. Especially when there are a variety of terminal devices having different computing powers at the same time, if a terminal device where the object detection application locates is judged to have strong computing power and many computing resources remained, the terminal device may perform the above operations, thereby appropriately alleviating computing pressure of the server 105. Correspondingly, the apparatus for detecting a target object may also be provided in the terminal devices 101, 102, 103. In this circumstance, the example system architecture 100 may not include the server 105 and the network 104.

It should be understood that the number of terminal devices, networks, and servers in FIG. 1 is merely illustrative. Depending on the implementation needs, there may be any number of terminal devices, networks, and servers.

Figure 2:
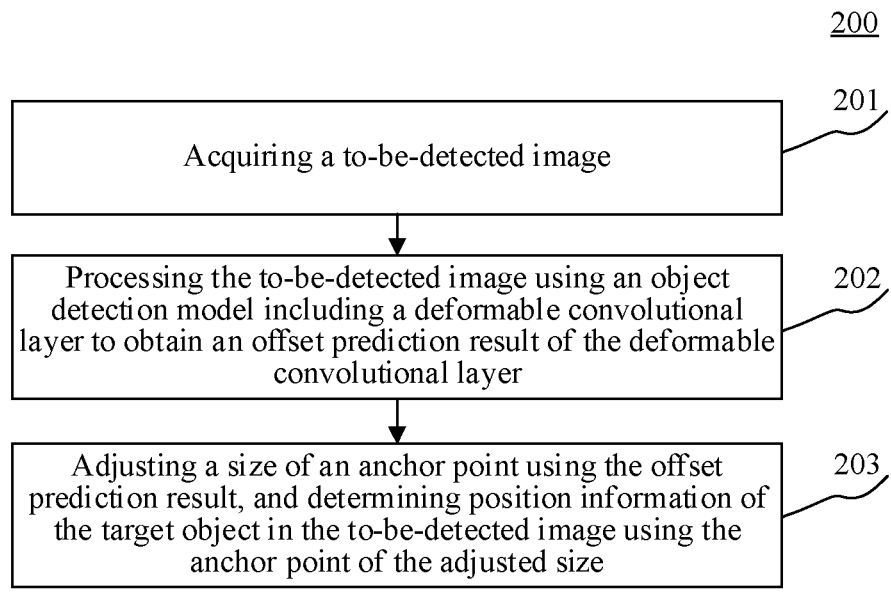
FIG. 2 is a flowchart of a method for detecting a target object according to an embodiment of the present disclosure.

With reference to FIG. 2, FIG. 2 is a flowchart of a method for detecting a target object according to an embodiment of the present disclosure. A flow 200 includes the following steps.

Step 201: acquiring a to-be-detected image.

This step aims to acquire the to-be-detected image by an executing body (for example, the server 105 shown in FIG. 1) of the method for detecting a target object.

Since the purpose of the present disclosure is to detect whether the target object is included in the to-be-detected image, the to-be-detected image is an image suspected of including the target object. Depending on different types of the target object, the to-be-detected image may be acquired through a plurality of channels. For example, in a pedestrian detection scenario, the purpose is to detect whether there is a passing pedestrian in the to-be-detected image. Then, the to-be-detected image that may include the passing pedestrian may be captured by a surveillance camera installed around the road. If a surveillance video is directly obtained, a plurality of to-be-detected images may also be acquired by splitting the surveillance video into a plurality of surveillance image frames; in a face recognition scenario, according to the subsequent using method of face recognition, the to-be-detected image may be captured by a variety of terminal devices equipped with cameras, such as a vending machine that supports face recognition. In addition to the real-time acquired to-be-detected image, the to-be-detected image may alternatively be a to-be-detected image obtained by performing blurring or similar processing on an existing image including the target object, used for testing a detection accuracy of the object detection model.

Further, in order to facilitate subsequent processing of the to-be-detected image, before actual detection starts, a variety of preprocessing methods may also be used to highlight a relevant image feature used to recognize the target object in the to-be-detected image, such as improving contrast, filtering, adjusting color values, or removing interference parts, which is not limited herein.

Step 202: processing the to-be-detected image using an object detection model including a deformable convolutional layer to obtain an offset prediction result of the deformable convolutional layer.

on the basis of step 201, the purpose of this step is to process the to-be-detected image using the object detection model including the deformable convolutional layer by the executing body, to obtain the offset prediction result of the deformable convolutional layer.

The deformable convolutional layer is a convolutional layer that uses a deformable convolutional kernel. The deformable convolutional kernel is another convolutional kernel that is different from a conventional convolutional kernel of a fixed size. The deformable convolutional kernel is obtained by offsetting on the conventional convolutional kernel. The offset (that is, the offset prediction result output by the deformable convolutional layer) is obtained by learning from the image feature in advance, and is used to represent a relative positional relationship between the fixed size of the conventional convolutional kernel and an actual size of the target object. Compared with the conventional rectangular convolutional kernel, the deformable convolutional kernel after the offset may be deformed into any size. The offset prediction result of the deformable convolutional layer may also be constantly updated to gradually more adapt to the actual size of the target object.

The use of the object detection model including the deformable convolutional layer to process the to-be-detected image is to extract an image feature corresponding to the size of the target object from the to-be-detected image with the help of the deformable convolutional layer, that is, to improve the existing method of ignoring the size of the target object in extracting the image feature using the conventional convolutional kernel of the fixed size. In other words, for an object having a size smaller than a preset size (which may be simply understood as a small-sized object), appropriately expanding the deformable convolutional kernel outward, so that the image feature extracted by the deformable convolutional kernel after the outward expansion may include information of a larger receptive field, thus other image features (such as a background image feature) included in the larger receptive field except the target object may be used to better recognize the target object; and for an object having a size not smaller than the preset size (which may be simply understood as a large-sized object), appropriately shrinking the deformable convolutional kernel inward, so that the image feature extracted by the deformable convolutional kernel after the inward shrinking focus on local as much as possible.

This step uses the deformable convolutional layer to extract the image feature corresponding to the size of the target object to reduce a feature difference between objects of different sizes, that is, extract relatively smaller image feature for the large-sized object, and extract relatively larger image feature for the small-sized object, try to make the objects of different sizes output the same size image feature, so that a subsequent classification task may be performed more easily on a unified feature description, further generating a more accurate classification result. The classification result is used to describe a possibility that whether a detection frame includes the target object.

Step 203: adjusting a size of an anchor point using the offset prediction result, and determining position information of the target object in the to-be-detected image using the anchor point of the adjusted size.

On the basis of step 202, the purpose of this step is to use an offset in the offset prediction result to adjust a default size of the anchor point by the executing body, so that a new size of the adjusted anchor point is more adapted to the actual size of the target object, and then the new anchor point closer to the actual size of the target object is used to more accurately determine the position information of the target object in the to-be-detected image.

It should be understood that in the conventional object detection scheme, the size of the anchor point is a set of predetermined fixed sizes, such as 2×2, 5×6, 6×5. Therefore, when a set of fixed sizes of the anchor point is predetermined, in order to find an optimal detection frame having the least proportion part except for the target object as accurately as possible, the prior art needs to try to calculate an IOU value (positioned as a ratio of an intersection and union of areas of two rectangular frames) for each anchor point of different size, so as to find a detection frame having the IOU value closest to 1. Considering that the anchor point needs to continuously slide on the entire to-be-detected image, this may inevitably bring more calculation. Moreover, it is also necessary to consider that the given set of sizes of the anchor point may not be particularly suitable for the actual size of the target object. In this case, it is inevitable that the detection accuracy of the target object may not be particularly high.

In view of the above technical shortcomings, the present disclosure does not give more default anchor points of different sizes to improve the detection accuracy through more attempts, but resorts to the offset that can represent the size of the target object to a certain extent to guide to adjust the size of the anchor point, that is, the original size of the anchor point that does not match the actual size of the target object is adjusted to a size of the anchor point that is more consistent with the actual size, which not only reduces the number of blind attempts, but also improves the detection accuracy.

The method for detecting a target object provided by an embodiment of the present disclosure, the deformable convolutional layer is applied to reduce a feature difference between objects of different sizes, and the offset prediction result of the deformable convolutional layer is used to guide to adjust the size of the anchor point, so that the anchor point of the adjusted size is consistent with the size of the target object. Further, more accurate object detection may be achieved by using the anchor point corresponding to the size of the target object.

Figure 3:
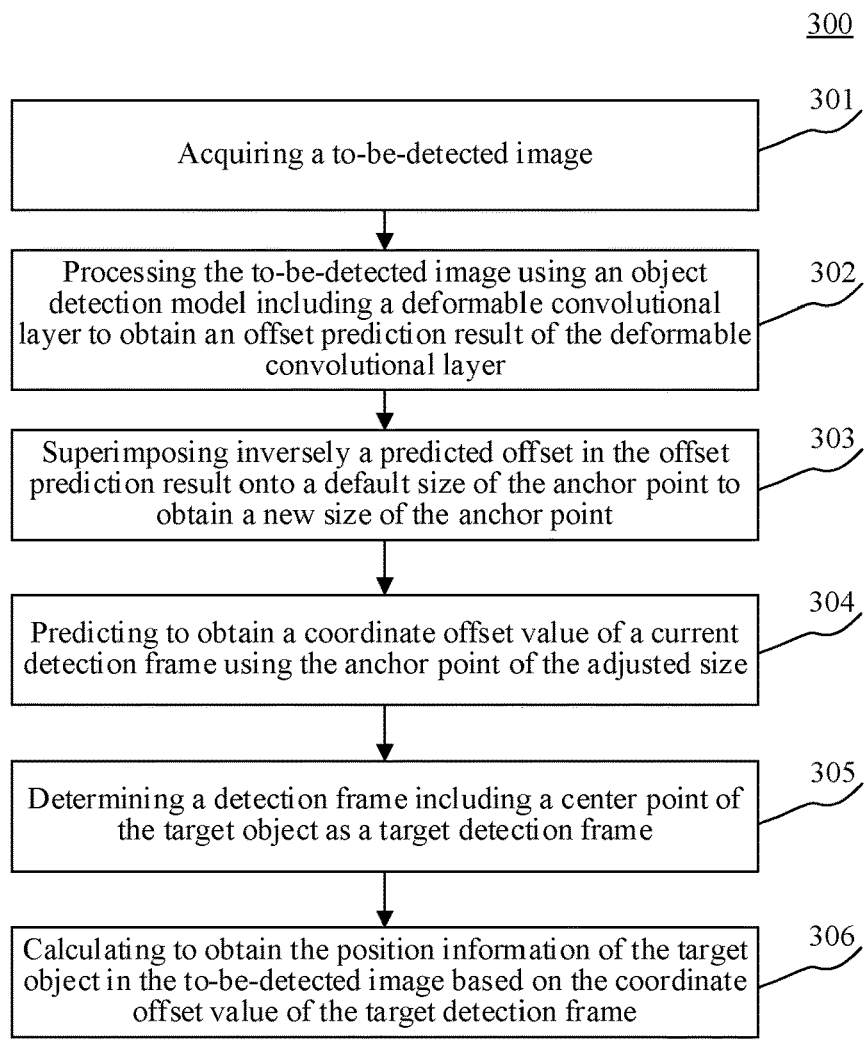
FIG. 3 is a flowchart of another method for detecting a target object according to an embodiment of the present disclosure.

With reference to FIG. 3, FIG. 3 is a flowchart of another method for detecting a target object according to an embodiment of the present disclosure. A flow 300 includes the following steps.

Step 301: acquiring a to-be-detected image.

Step 302: processing the to-be-detected image using an object detection model including a deformable convolutional layer to obtain an offset prediction result of the deformable convolutional layer.

The above steps 301-202 are consistent with the steps 201-202 shown in FIG. 2. For the same part of content, reference may be made to the corresponding part in the previous embodiment, and repeated description thereof will be omitted.

Step 303: superimposing inversely a predicted offset in the offset prediction result onto a default size of the anchor point to obtain a new size of the anchor point.

The purpose of this step is to obtain the new size of the anchor point that more closely matches the actual size of the target object by inversely superimposing the predicted offset in the offset prediction result onto the default size of the anchor point by the executing body. The reason why the inverse superposition method is used is that a predicted offset value output by the deformable convolutional layer is opposite to an improvement direction of the anchor point.

Step 304: predicting to obtain a coordinate offset value of a current detection frame using the anchor point of the adjusted size.

On the basis of step 303, the purpose of this step is to use the anchor point of the new size to predict to obtain the coordinate offset value of the current detection frame by the executing body. The coordinate offset value is used to describe a position of the current detection frame in the to-be-detected image in a positioning phase. The offset value is jointly determined with a reference value. The offset value may be composed of four values: upper right, lower right, lower left, and upper left.

Step 305: determining a detection frame including a center point of the target object as a target detection frame.

On the basis of step 304, the purpose of this step is to determine which detection frame is the target detection frame according to whether a detection frame includes the center point of the target object.

Step 306: calculating to obtain the position information of the target object in the to-be-detected image based on the coordinate offset value of the target detection frame.

On the basis of step 305, the purpose of this step is to calculate to obtain the position information of the target object in the to-be-detected image based on the coordinate offset value of the target detection frame by the executing body.

On the basis of the previous embodiment, the present embodiment provides a specific low-level implementation of step 203 in the flow 200 through step 303 to step 306. First, by inversely superimposing the offset prediction result on the default size of the anchor point, the new size of the anchor point that more closely matches the actual size of the target object is obtained, and then the coordinate offset value of the current detection frame is obtained by prediction in the positioning phase with the aid of the anchor point of the new size, and when the target detection frame is determined, the position information of the target object in the to-be-detected image may be determined based on the coordinate offset value of the target detection frame.

It should be understood that there is no causal or dependent relationship between the solution of determining the position information of the target object in the to-be-detected image provided in step 304 to step 306 and the method for adjusting the size of the anchor point given in step 303. Step 304 to step 306 only serves as a specific lower-level implementation of "determining the position information of the target object in the to-be-detected image using the anchor point of the new size". A two-part preferred lower-level implementation may completely form two separate embodiments with the previous embodiment. The present embodiment only exists as a preferred embodiment in which there is the two-part preferred lower-level implementation.

Figure 4:
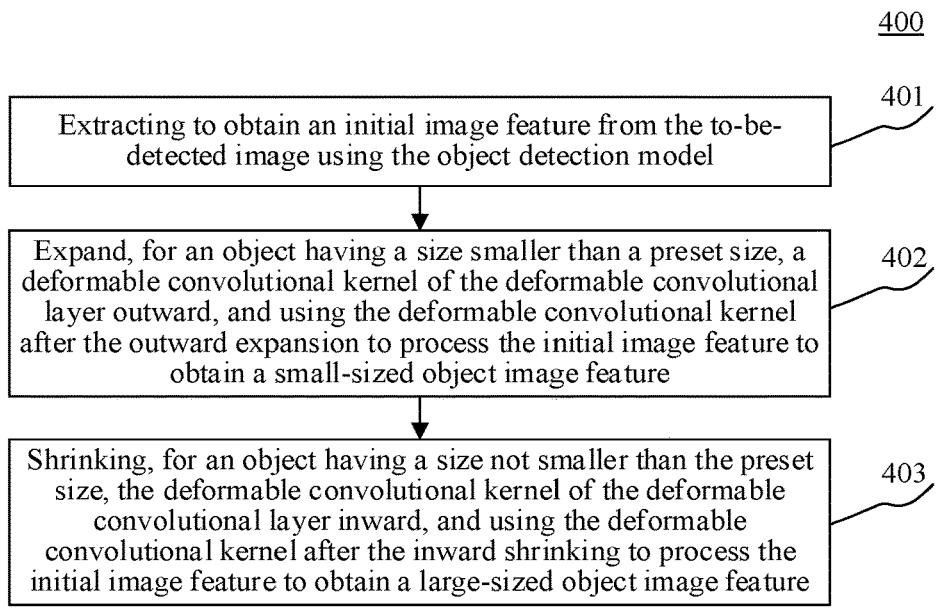
FIG. 4 is a schematic flowchart of a method for processing a to-be-detected image using an object detection model in the method for detecting a target object according to an embodiment of the present disclosure.

In order to deepen the understanding of how the deformable convolutional layer processes the to-be-detected image, how to output the image feature of the same size for objects of different sizes, so as to achieve the effect of generating a more accurate classification result, the present embodiment also provides a specific implementation. It should be noted in advance that the processing object of the deformable convolutional layer is the image feature extracted from the to-be-detected image, that is, the object detection model needs to be used to extract the initial image feature from the to-be-detected image, and then the deformable convolutional layer is used to process the initial image feature to obtain the processed image feature that use the same size to represent different objects of different sizes. On this basis, reference may be made to a flowchart of a specific implementation shown in FIG. 4. A flow 400 includes the following steps.

Step 401: extracting to obtain an initial image feature from the to-be-detected image using the object detection model.

Step 402: expand, for an object having a size smaller than a preset size, a deformable convolutional kernel of the deformable convolutional layer outward, and using the deformable convolutional kernel after the outward expansion to process the initial image feature to obtain a small-sized object image feature.

That is, for a small-sized object, by expanding the deformable convolutional kernel outward, the image feature extracted by the deformable convolutional kernel after the outward expansion may include information of a larger receptive field, thus other image features (such as a background image feature) included in the larger receptive field except the target object may be used to better recognize the target object.

Step 403: shrinking, for an object having a size not smaller than the preset size, the deformable convolutional kernel of the deformable convolutional layer inward, and using the deformable convolutional kernel after the inward shrinking to process the initial image feature to obtain a large-sized object image feature.

For a large-sized object, by shrinking the deformable convolutional kernel inward, the image feature extracted by the deformable convolutional kernel after the inward shrinking may focus on local as much as possible, so that the small-sized object image feature and the large-sized object image feature have the same degree of accuracy in detecting the small-sized object and the large-sized object, respectively. Further, a preset number of down-sampling operations may also be supplemented to ensure that the image feature extraction of the target object after the inward shrinking is complete.

On the basis of the above embodiments, the present embodiment provides the outward expanding and inward shrinking convolutional kernel deformation schemes for the small-sized object and the large-sized object respectively, so as to make the objects of different sizes output same size image feature, so that a subsequent classification task may be performed more easily on a unified feature description, further generating a more accurate classification result.

On the basis of any of the foregoing embodiments, after determining the position information of the target object in the to-be-detected image, there may also be subsequent processing methods in different application scenarios. For example, in a pedestrian detection scenario, a target object included in an area corresponding to the position information may also be determined as a tracking target based on incoming information, and then an action trajectory of the tracking target may be determined from a video including the tracking target, to further judge whether a pedestrian has any illegal operation in the course of the action, such as running the red light, or turning over a railing, based on the pedestrian's action trajectory.

In other scenarios, such as a face recognition scenario, a framed target face may also be recorded and stored to enrich a database to improve a subsequent face detection speed and so on.

To deepen understanding, the an embodiment of the present disclosure also provides a specific implementation scheme in combination with a specific application scenario:

For a pedestrian motion detection scenario at an intersection, it is necessary to use a surveillance video captured by a surveillance camera set up at the intersection, to recognize a pedestrian passing through the intersection from video content, and further judge whether the pedestrian walks the sidewalk and runs the red light based on a recognized action trajectory of the pedestrian.

1) A server receives the surveillance video captured by the surveillance camera set in the vicinity of the target intersection.

2) The server calls a locally stored pedestrian detection model including a deformable convolutional layer to detect respectively whether there is a pedestrian in each frame of surveillance image that constitutes the surveillance video.

3) The server uses a detection frame that matches an actual size of the pedestrian appearing in the surveillance image to calibrate a target detection frame of each of the pedestrian. It is assumed that a total of 3 pedestrians A, B, and C appear in the video, passing the intersection at a distance of 50 meters, 80 meters, and 150 meters from the camera, respectively. The size of the target detection frame is respectively large, normal, small.

4) The server summarizes position information of the same pedestrian in each frame of surveillance image, to obtain the action trajectory of each pedestrian, and judges that: pedestrian A does not run the red light and walks the sidewalk to pass through the intersection; pedestrian B runs the red light and walks the sidewalk to pass through the intersection; and pedestrian C does not run the red light, but turns over the railing to pass through the intersection.

Figure 5:
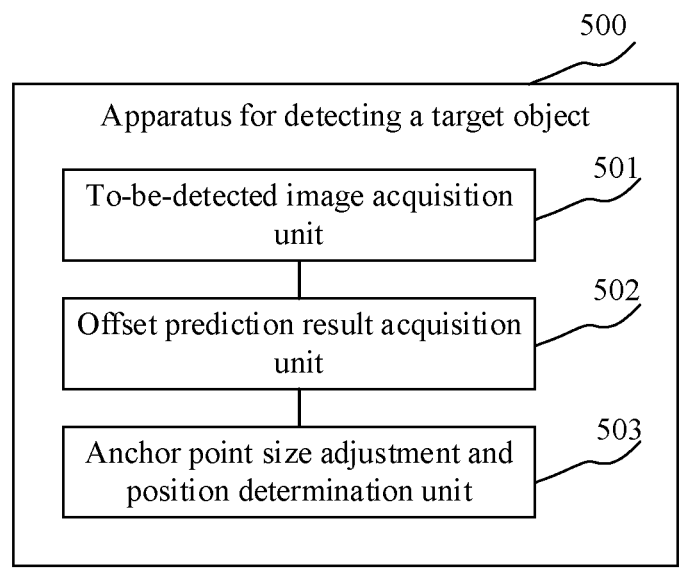
FIG. 5 is a structural block diagram of an apparatus for detecting a target object according to an embodiment of the present disclosure.

With further reference to FIG. 5, as an implementation of the method shown in the above figures, an embodiment of the present disclosure provides an apparatus for detecting a target object, and the apparatus embodiment corresponds to the method embodiment as shown in FIG. 2. The apparatus may be specifically applied to various electronic devices.

As shown in FIG. 5, an apparatus 500 for detecting a target object of the present embodiment may include: a to-be-detected image acquisition unit 501, an offset prediction result acquisition unit 502 and an anchor point size adjustment and position determination unit 503. The to-be-detected image acquisition unit 501 is configured to acquire a to-be-detected image. The offset prediction result acquisition unit 502 is configured to process the to-be-detected image using an object detection model including a deformable convolutional layer to obtain an offset prediction result of the deformable convolutional layer. The anchor point size adjustment and position determination unit 503 is configured to adjust a size of an anchor point using the offset prediction result, and determine position information of the target object in the to-be-detected image using the anchor point of the adjusted size.

In the present embodiment, in the apparatus 500 for detecting a target object, for the specific processing and technical effects thereof of the to-be-detected image acquisition unit 501, the offset prediction result acquisition unit 502 and the anchor point size adjustment and position determination unit 503, reference may be made to the relevant description of steps 201-203 in the corresponding embodiment of FIG. 2 respectively, and repeated description thereof will be omitted.

In some alternative implementations of the present embodiment, the anchor point size adjustment and position determination unit 503 may be further configured to: superimpose inversely a predicted offset in the offset prediction result onto a default size of the anchor point to obtain a new size of the anchor point; and determine the position information of the target object in the to-be-detected image using the anchor point of the new size.

In some alternative implementations of the present embodiment, the anchor point size adjustment and position determination unit 503 may include a position determination subunit, configured to determine position information of the target object in the to-be-detected image using the anchor point of the adjusted size, and the position determination subunit may be further configured to: predict to obtain a coordinate offset value of a current detection frame using the anchor point of the adjusted size; determine a detection frame including a center point of the target object as a target detection frame; and calculate to obtain the position information of the target object in the to-be-detected image based on the coordinate offset value of the target detection frame.

In some alternative implementations of the present embodiment, the offset prediction result acquisition unit 502 may include: an initial image feature extraction subunit, configured to extract to obtain an initial image feature from the to-be-detected image using the object detection model; and a deformable convolutional layer processing subunit, configured to process the initial image feature using the deformable convolutional layer to obtain a processed image feature; where the processed image feature uses a same size to represent different objects of different sizes.

In some alternative implementations of the present embodiment, the deformable convolutional layer processing subunit may be further configured to: expand, for an object having a size smaller than a preset size, a deformable convolutional kernel of the deformable convolutional layer outward, and use the deformable convolutional kernel after the outward expansion to process the initial image feature to obtain a small-sized object image feature; and shrink, for an object having a size not smaller than the preset size, the deformable convolutional kernel of the deformable convolutional layer inward, and use the deformable convolutional kernel after the inward shrinking to process the initial image feature to obtain a large-sized object image feature.

In some alternative implementations of the present embodiment, for the object having the size not smaller than the preset size, the apparatus 500 for detecting a target object may further include: a down-sampling unit, configured to perform a preset number of down-sampling operations, before obtaining the large-sized object image feature.

In some alternative implementations of the present embodiment, the apparatus 500 for detecting a target object may further include: a tracking target determination unit, configured to determine a target object included in an area corresponding to the position information as a tracking target; and an action trajectory determination unit, configured to determine an action trajectory of the tracking target from a video including the tracking target.

The present embodiment serves as an apparatus embodiment corresponding to the foregoing method embodiment. The apparatus for detecting a target object provided by an embodiment of the present disclosure, the deformable convolutional layer is applied to reduce a feature difference between objects of different sizes, and the offset prediction result of the deformable convolutional layer is used to guide to adjust the size of the anchor point, so that the anchor point of the adjusted size is consistent with the size of the target object. Further, more accurate object detection may be achieved by using the anchor point corresponding to the size of the target object.

According to an embodiment of the present disclosure, the present disclosure further provides an electronic device and a computer readable storage medium.

Figure 6:
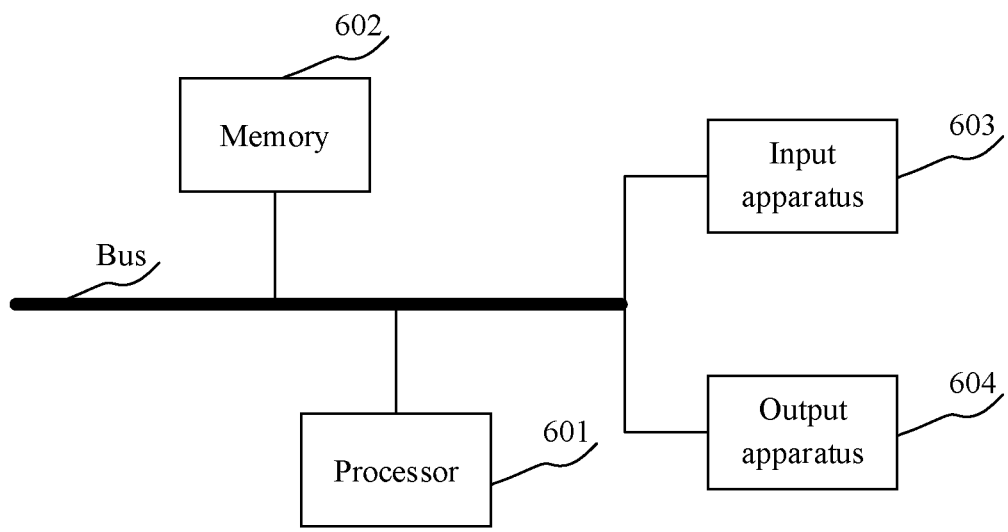
FIG. 6 is a schematic structural diagram of an electronic device suitable for performing the method for detecting a target object according to an embodiment of the present disclosure.

FIG. 6 is a block diagram of an electronic device suitable for performing the method for detecting a target object according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by the present disclosure. The memory stores instructions executable by at least one processor, so that the at least one processor performs the method for detecting a target object provided by the present disclosure. The non-transitory computer readable storage medium of the present disclosure stores computer instructions for causing a computer to perform the method for detecting a target object provided by the present disclosure.

The memory 602, as a non-transitory computer readable storage medium, may be used to store non-transitory software programs, non-transitory computer executable programs and modules, such as program instructions/modules corresponding to the method for detecting a target object in the embodiments of the present disclosure (for example, the to-be-detected image acquisition unit 501, the offset prediction result acquisition unit 502 and the anchor point size adjustment and position determination unit 503 as shown in FIG. 5). The processor 601 executes the non-transitory software programs, instructions, and modules stored in the memory 602 to execute various functional applications and data processing of the server, that is, to implement the method for detecting a target object in the foregoing method embodiments.

The memory 602 may include a storage program area and a storage data area, where the storage program area may store an operating system and at least one function required application program; and the storage data area may store data created by the use of the electronic device according to the method for detecting a target object, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for detecting a target object through a network. Examples of the above network include but are not limited to the Internet, intranet, local area network, mobile communication network, and combinations thereof.

The electronic device of the method for detecting a target object may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for detecting a target object, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other. The server may be a cloud server, also known as a cloud computing server or a cloud host. It is a host product in the cloud computing service system to solve the defects of large management difficulty and weak business scalability in traditional physical host and virtual private server (VPS).

In the embodiments of the present disclosure, the deformable convolutional layer is applied to reduce a feature difference between objects of different sizes, and the offset prediction result of the deformable convolutional layer is used to guide to adjust the size of the anchor point, so that the anchor point of the adjusted size is consistent with the size of the target object. Further, more accurate object detection may be achieved by using the anchor point corresponding to the size of the target object.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for detecting a target object, the method comprising:
   acquiring a to-be-detected image;
   processing the to-be-detected image using an object detection model including a deformable convolutional layer to obtain an offset prediction result of the deformable convolutional layer; and
   adjusting a size of an anchor point using the offset prediction result, and determining position information of the target object in the to-be-detected image using the anchor point of the adjusted size;
   wherein the processing the to-be-detected image using an object detection model including a deformable convolutional layer, comprises:
   extracting to obtain an initial image feature from the to-be-detected image using the object detection model; and
   processing the initial image feature using the deformable convolutional layer to obtain a processed image feature; wherein the processed image feature uses a same size to represent different objects of different sizes;
   wherein the processing the initial image feature using the deformable convolutional layer to obtain a processed image feature, comprises:
   expanding, for an object having a size smaller than a preset size, a deformable convolutional kernel of the deformable convolutional layer outward, and using the deformable convolutional kernel after the outward expansion to process the initial image feature to obtain a small-sized object image feature; and
   shrinking, for an object having a size not smaller than the preset size, the deformable convolutional kernel of the deformable convolutional layer inward, and using the deformable convolutional kernel after the inward shrinking to process the initial image feature to obtain a large-sized object image feature.

2. The method according to claim 1, wherein the adjusting a size of an anchor point using the offset prediction result, and determining position information of the target object in the to-be-detected image using the anchor point of the adjusted size, comprises:
   superimposing inversely a predicted offset in the offset prediction result onto a default size of the anchor point to obtain a new size of the anchor point; and
   determining the position information of the target object in the to-be-detected image using the anchor point of the new size.

3. The method according to claim 1, wherein the determining position information of the target object in the to-be-detected image using the anchor point of the adjusted size, comprises:
   predicting to obtain a coordinate offset value of a current detection frame using the anchor point of the adjusted size;
   determining a detection frame including a center point of the target object as a target detection frame; and
   calculating to obtain the position information of the target object in the to-be-detected image based on the coordinate offset value of the target detection frame.

4. The method according to claim 1, wherein for the object having the size not smaller than the preset size, before obtaining the large-sized object image feature, the method further comprises:
   performing a preset number of down-sampling operations.

5. The method according to claim 1, wherein the method further comprises:
   determining a target object included in an area corresponding to the position information as a tracking target; and
   determining an action trajectory of the tracking target from a video including the tracking target.

6. An electronic device, comprising:
at least one processor; and
a memory, communicatively connected to the at least one processor;
wherein the memory stores instructions executable by the at least one processor, the instructions, when executed by the at least one processor, cause the at least one processor to perform operations, comprising:
acquiring a to-be-detected image;
processing the to-be-detected image using an object detection model including a deformable convolutional layer to obtain an offset prediction result of the deformable convolutional layer; and
adjusting a size of an anchor point using the offset prediction result, and determining position information of the target object in the to-be-detected image using the anchor point of the adjusted size;
wherein the processing the to-be-detected image using an object detection model including a deformable convolutional layer, comprises:
extracting to obtain an initial image feature from the to-be-detected image using the object detection model; and
processing the initial image feature using the deformable convolutional layer to obtain a processed image feature; wherein the processed image feature uses a same size to represent different objects of different sizes;
wherein the processing the initial image feature using the deformable convolutional layer to obtain a processed image feature, comprises:
expanding, for an object having a size smaller than a preset size, a deformable convolutional kernel of the deformable convolutional layer outward, and using the deformable convolutional kernel after the outward expansion to process the initial image feature to obtain a small-sized object image feature; and
shrinking, for an object having a size not smaller than the preset size, the deformable convolutional kernel of the deformable convolutional layer inward, and using the deformable convolutional kernel after the inward shrinking to process the initial image feature to obtain a large-sized object image feature.

7. The electronic device according to claim 6, wherein the adjusting a size of an anchor point using the offset prediction result, and determining position information of the target object in the to-be-detected image using the anchor point of the adjusted size, comprises:
superimposing inversely a predicted offset in the offset prediction result onto a default size of the anchor point to obtain a new size of the anchor point; and
determining the position information of the target object in the to-be-detected image using the anchor point of the new size.

8. The electronic device according to claim 6, wherein the determining position information of the target object in the to-be-detected image using the anchor point of the adjusted size, comprises:
predicting to obtain a coordinate offset value of a current detection frame using the anchor point of the adjusted size;
determining a detection frame including a center point of the target object as a target detection frame; and
calculating to obtain the position information of the target object in the to-be-detected image based on the coordinate offset value of the target detection frame.

9. The electronic device according to claim 8, wherein for the object having the size not smaller than the preset size, before obtaining the large-sized object image feature, the method further comprises:
performing a preset number of down-sampling operations.

10. The electronic device according to claim 6, wherein the operations further comprise:
determining a target object included in an area corresponding to the position information as a tracking target; and
determining an action trajectory of the tracking target from a video including the tracking target.

11. A non-transitory computer readable storage medium, storing computer instructions, the computer instructions, being used to cause the computer to perform the method for detecting a target object according to claim 1.

* * * * *